June 19, 1928. 1,674,244
O. W. GUSTAVSON
RAT TRAP
Filed Aug. 10, 1927 2 Sheets-Sheet 1
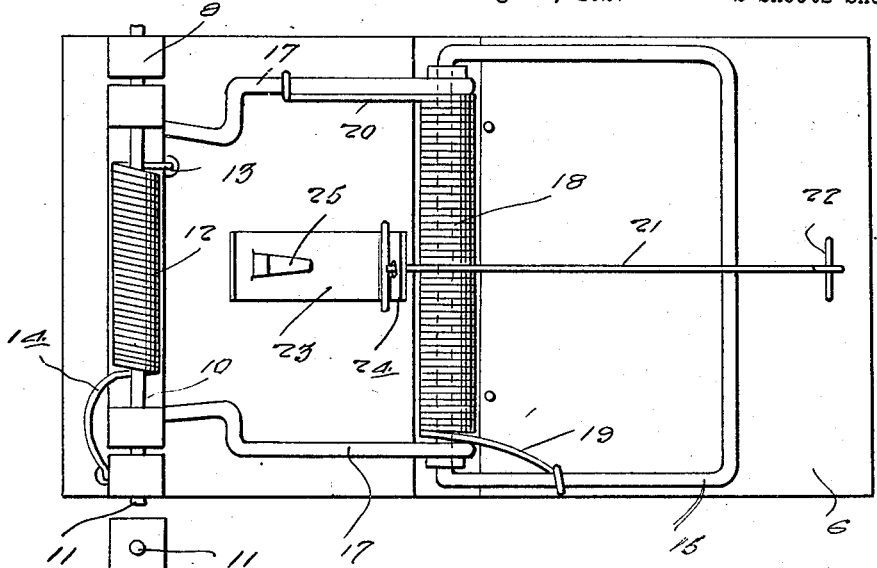
Fig. 1.
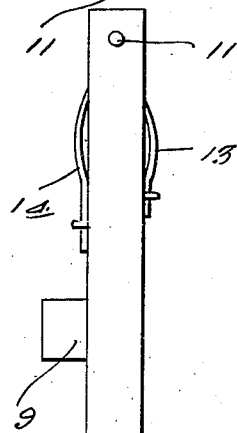
Fig. 2.
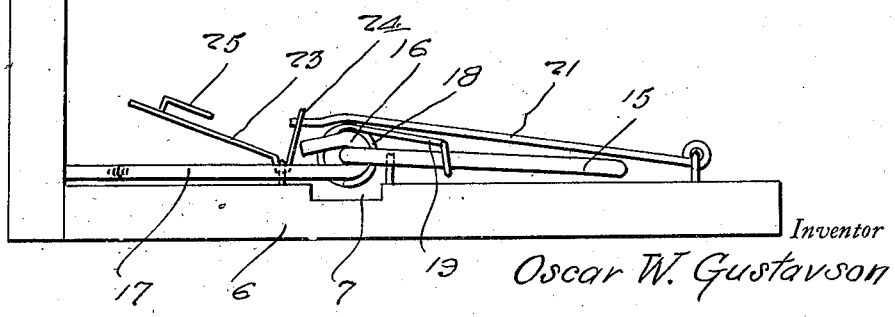
Inventor
Oscar W. Gustavson
By Clarence A. O'Brien
Attorney

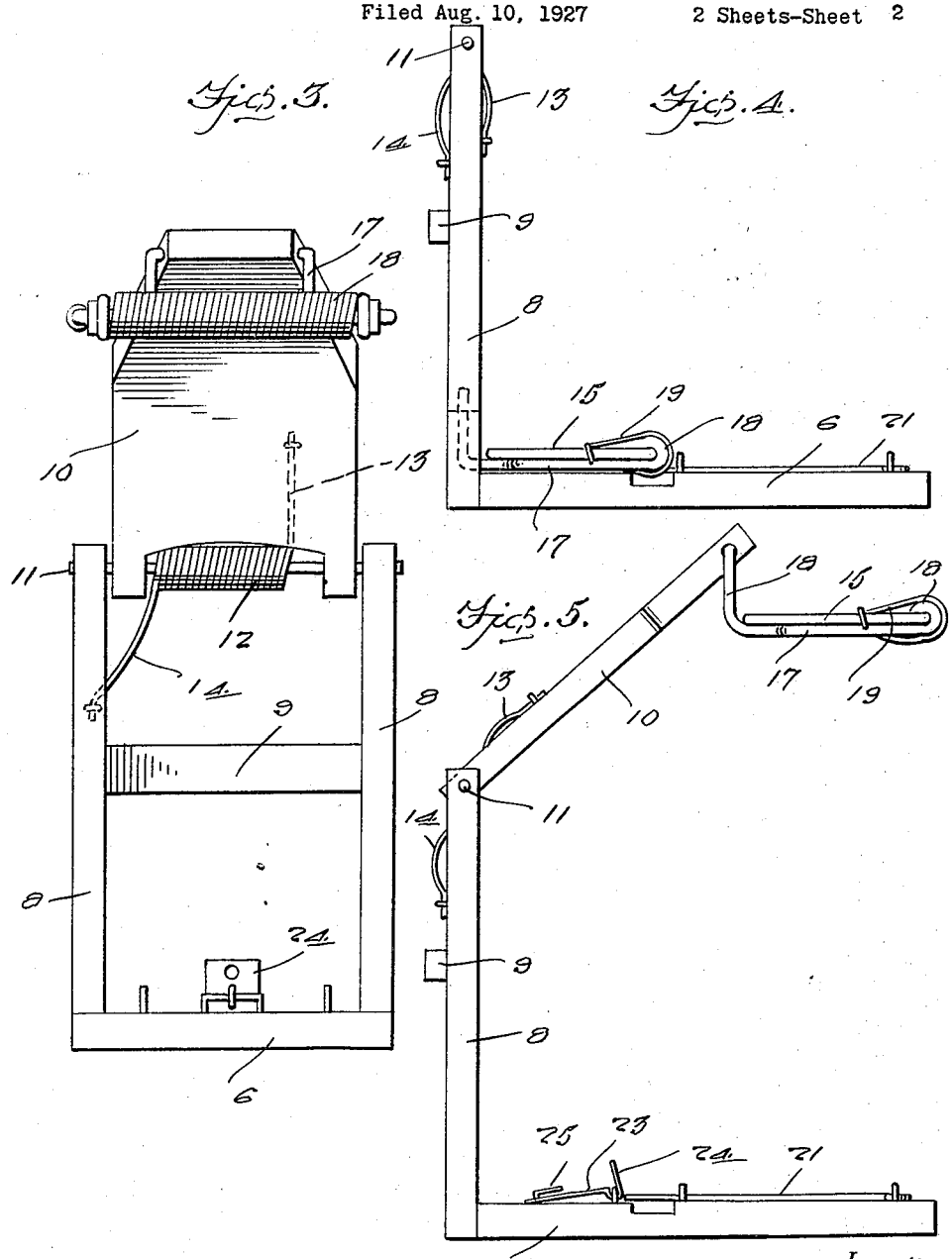

Patented June 19, 1928.

1,674,244

UNITED STATES PATENT OFFICE.

OSCAR W. GUSTAVSON, OF MARLBORO, NEW HAMPSHIRE.

RAT TRAP.

Application filed August 10, 1927. Serial No. 212,088.

This invention relates to an improved rat trap which is characterized by means for lifting the trapping unit and swinging it to an elevated position, with a view toward suspending the entrapped rat in the air, to overcome the possibility of freeing himself from the trap.

The improved details for accomplishing this new result will become more readily apparent from the following description and drawings.

In the drawings:—

Figure 1 is a top plan view of a trap constructed in accordance with the invention.

Fig. 2 is a side elevation of the same, showing the trap set.

Fig. 3 is a front view showing the trap swung up.

Fig. 4 is a side view like Fig. 2 showing the trap closed and just ready to swing up.

Fig. 5 is a view of Fig. 4, showing the further step of the trap, closed and swung up to rat suspending position.

Referring to the drawings by numerals, it will be observed that the character 6 designates a base board, provided in its top and between its ends with a transverse groove 7. At one end of the base board, we find spaced uprights 8 connected together intermediate their ends by a cross piece 9.

Associated with the uprights, is what is designated generally a carrier. This comprises a substantially rectangular board 10 swingably mounted on a horizontal shaft 11 extending through the upper end of the uprights. A coiled spring 12 surrounds this shaft and is located in a notch formed in the adjacent end of the board 10, having one arm 13 anchored on the board, and the other arm 14 anchored on one of the uprights, as shown plainly in Fig. 3.

The normal tendency of the spring is to swing the board from a vertical position to an elevated position.

Associated with the carrier is the trap. This comprises a substantially rectangular wire frame 15 rockably mounted in the bent end portions 16 of a pair of wire arms 17. The wire arms have right angularly bent end portions pivotally connected with the free end portion of the carrier board 10. By noting Fig. 1, it will be observed that a second coiled spring 18 is located between the bent portions 16 and surrounds one of the side bars of the aforesaid frame 15.

One end 19 of the spring 18 is fastened to the frame 15, and the other end 20 (see Fig. 1), is connected with one of the arms 17. Thus, the tendency of the spring is to swing the frame 15 over and against the wire arms 17 and to entrap the animal therebetween. The aforesaid groove 7 serves to accommodate the spring 18.

A trip wire 21 extends across the central portion of the coiled spring 18 and is pivotally mounted on a bracket as at 22 on the base board. This wire co-operates with a bait holder which comprises a small plate 23, rockably mounted in the customary manner, and having an upstanding apertured ear 24 through which the free end portion of the wire 21 extends. This plate 23 is provided with a bait hook 25.

In practice, the carrier board 10 is swung down between the uprights 8. This allows the wire arm 17 to drop down onto the base board 6. Owing to the normal tendency of the spring 18, the trapping frame 15 is in superposed relation with the wire arms 17. However, the frame is swung over against the tension of the spring to the position shown in Figs. 1 and 2.

At this time, the trip wire rod 21 is hooked into the upstanding end 24 on the bait holder 23, the holder having been previously baited for the catch. The trap is now set.

With the trap thus set, it is obvious that when tripped in the customary manner, the frame 15 will swing over rapidly upon the arms 17 and entrap the neck of the animal. At the same time the spring 12 will come into play to lift or swing the carrier and the trap, together with the animal from the previous horizontal position to the elevated position shown in Fig. 5. The animal will thus be suspended in the air and unable to gnaw or wiggle himself loose.

It is obvious too, that the trip means serves to hold the carrier in a down position, as well as to hold the trap in a set position, thus giving it a double function.

It is believed that the construction, and operation of the invention will be quite clear considering the description in connection with the drawings for which reason, a more lengthy description is believed unnecessary.

Minor changes in shape, size, and re-arrangement coming within the field of invention claimed, may be resorted to if desired.

Having thus described my invention, what I claim as new is:—

1. In a structure of the class described, a base, an upright at one end of the base, arms connected with said upright, and provided at their free ends with bent eyes, a trapping frame pivotally mounted in said eyes, a coiled spring having its ends connected with the frame and one of said arms, a trip wire mounted on the base, and a bait holder with which said trip wire is releasably engaged.

2. In a structure of the class described, a base, uprights rising from said base, a carrier pivotally mounted on said uprights, said carrier being movable from a vertical position to an elevated position, and trapping means connected with said carrier.

3. In a structure of the class described, a base, uprights rising from said base, a board swingably mounted between said uprights, a spring for swinging said board from a vertical lowered portion to an elevated animal suspending position, trapping means carried by the free end of said board, and animal actuated release means for the trap mounted on said base.

4. In a structure of the class described, a base board, uprights rising from one end of the base board, a carrier board swingably mounted between the uprights, a coiled spring connected at one end to one of the uprights and at its opposite end to said board for normally urging said board to an elevated position, wire arms connected with the free end portion of the board and adapted to overlie said base, a trapping frame pivotally mounted on said wire arms, a coiled spring associated with said arms and frame, and animal actuated releasing means for the frame.

In testimony whereof I affix my signature.

OSCAR W. GUSTAVSON.